(No Model.)
T. B. HEINEY & C. G. LAUCK.
WRENCH.
No. 332,522. Patented Dec. 15, 1885.
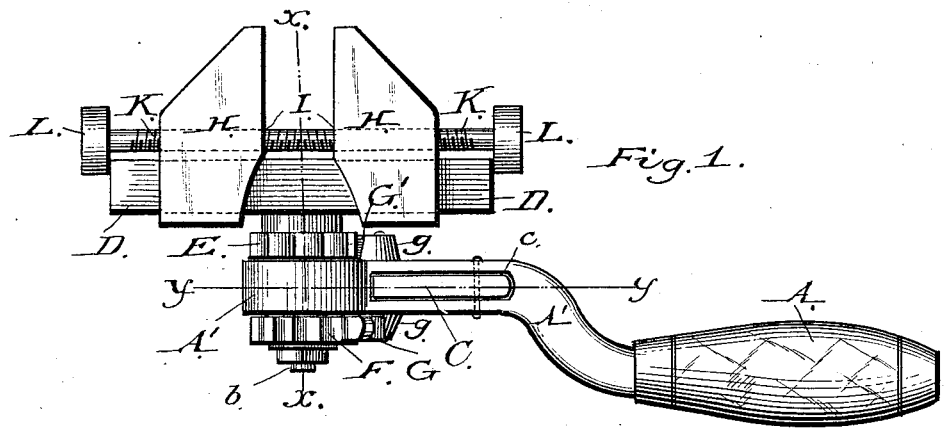
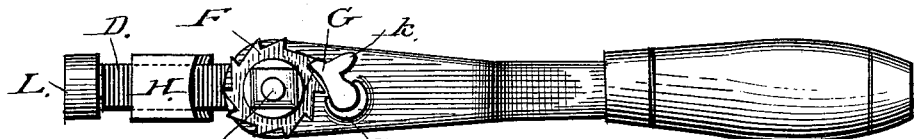
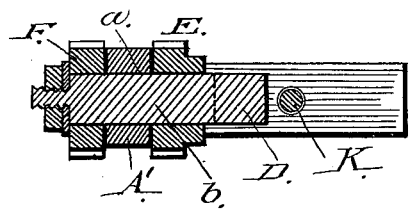
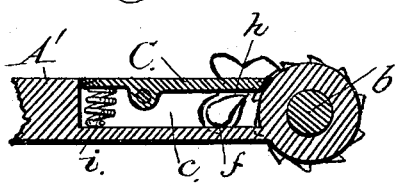 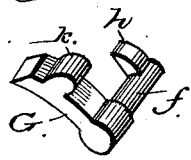
Witnesses
T. Walter Fowler
H. B. Applewhaite
Inventors
Thomas B. Heiney,
Clarence G. Lauck
By their Attorneys
A. H. Evans & Co.

UNITED STATES PATENT OFFICE.

THOMAS B. HEINEY AND CLARENCE G. LAUCK, OF BUCYRUS, OHIO.

WRENCH.

SPECIFICATION forming part of Letters Patent No. 332,522, dated December 15, 1885.

Application filed September 28, 1885. Serial No. 178,415. (No model.)

*To all whom it may concern:*

Be it known that we, THOMAS B. HEINEY and CLARENCE G. LAUCK, citizens of the United States, residing at Bucyrus, in the county of Crawford and State of Ohio, have invented certain new and useful Improvements in Wrenches, of which the following is a full, clear, and exact description, reference being had to the accompanying drawings, forming part of this specification, in which—

Figure 1 represents a plan view of a wrench embodying our improvements. Fig. 2 represents a side elevation of the same. Fig. 3 is a section on the line $x\ x$ of Fig. 1. Fig. 4 is a section on the line $y\ y$ of Fig. 1. Fig. 5 is a detail, to be hereinafter referred to.

Our invention relates to wrenches; and the same consists in the construction and combination of devices, which will be hereinafter fully described, and specifically pointed out in the claims.

To enable others skilled in the art to make and use our invention, we will proceed to describe the manner in which we have carried it out.

In the said drawings, A represents the handle of the wrench, and A' an extension of the same. In the forward end of the extension is formed a perforation, $a$, for the reception of a transverse stud, upon which the extension is mounted. Within a slot, $c$, in the extension A' is pivoted a dog, C, the purpose of which will be hereinafter described. A bar, D, is placed parallel with the extension A', and it has formed integral therewith and projecting at right angles from its central portion a stud, $b$, upon which are firmly keyed the ratchet-wheels E and F, the former being placed between the extension A' and the bar D, and the latter on the outside of the extension, the several parts being secured upon the stud by a nut and washer or equivalent means. Suitable transverse perforations are formed in the extension A' for the reception of the pintles $f$ of the pawls G G', mounted in suitable bearings, $g$, projecting from and forming a part of the extension A'. The inner ends of the pintles $f$ are provided with cams $h$, which engage the under face of the dog C, and by pressing up the latter permit the pawl G or G' to be thrown from its contact with the teeth of its ratchet-wheel. A spring, $i$, is placed in the slot $c$, and, bearing against the short arm of the dog, causes the released pawl to remain in its locked or disengaged condition until it is again thrown into engagement with its ratchet-wheel. Each of the pawls, in addition to its cams, has formed on its outer surface a thumb-piece, $k$, which facilitates the operation of said pawls.

Upon the bar D are mounted two oppositely-sliding jaws, H H, provided each with a threaded perforation, I, through which passes a screw, K, provided with right and left hand threads for moving the jaws from or toward each other. Suitable heads, L, are formed on each end of the screw, and, bearing against the ends of the bar D, furnish the required means for the successful operation of the screw and jaws.

The device, when completed, is of great use in the successful and rapid adjustment and removal of nuts, or for any purpose in which the services of a wrench are required.

The operation of the device is easily understood. The jaws are adjusted by means of the screw until they firmly bear against the nut or other object to be removed or adjusted. For instance, if it be desired to screw the nut on a carriage-axle, the pawl G is thrown into engagement with the ratchet-wheel E and the pawl G' released from its engagement with its ratchet-wheel, each of the pawls being held in its proper position by the spring-actuated dog. The handle is then worked from the operator and the nut secured.

To unscrew the nut, the operation and arrangement of the pawls are reversed.

Having thus described our invention, what we claim as new, and desire to secure by Letters Patent, is—

1. In a wrench, a suitable handle, in combination with a bar, D, the oppositely-sliding jaws upon the bar, and the independent oppositely-working ratchet-wheels and pawls, substantially as herein described.

2. In a wrench, the handle, the oppositely-sliding jaws, and the ratchet-wheels, in combination with the bar D, provided with a projecting stud, upon which the wheels are mounted, the pawls engaging the ratchet-wheel, and a spring-actuated dog pivoted within a slot or recess in the handle for retaining the pawls in position, substantially as herein described.

3. A wrench comprising a handle, a bar having a projecting stud, suitable independent oppositely-arranged ratchet-wheels upon the stud, and independent pawls for engaging the wheels, sliding jaws upon the bar D, and a screw for operating the jaws, substantially as herein described.

4. In a wrench, the combination, with the handle, the bar D, and the pawl-and-ratchet mechanism, of the sliding jaws upon the bar, the actuating-screw, and the heads bearing against the ends of the bar, substantially as herein described.

5. In a wrench, the handle, the bar D, and the sliding jaws, in combination with the oppositely-arranged ratchet-wheels, the pawls journaled on the extension A' and provided with pintles, cams, and the spring-actuated dog pivoted within a recess on the handle, substantially as herein described.

THOMAS B. HEINEY.
CLARENCE G. LAUCK.

Witnesses:
S. R. HARRIS,
JOHN A. MECK.